United States Patent
Lee et al.

(10) Patent No.: US 12,298,229 B2
(45) Date of Patent: May 13, 2025

(54) DRY QUALITY EVALUATION DEVICE FOR ELECTRODE AND DRY QUALITY EVALUATION METHOD FOR ELECTRODE

(71) Applicant: LG ENERGY SOLUTION, LTD., Seoul (KR)

(72) Inventors: Kyung Mee Lee, Daejeon (KR); Won Seok Cho, Daejeon (KR); Hyun Jin Yang, Daejeon (KR); Kyoung Ho Kim, Daejeon (KR); Myung Han Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 202 days.

(21) Appl. No.: 17/797,455

(22) PCT Filed: Nov. 11, 2020

(86) PCT No.: PCT/KR2020/015814
§ 371 (c)(1),
(2) Date: Aug. 4, 2022

(87) PCT Pub. No.: WO2022/045454
PCT Pub. Date: Mar. 3, 2022

(65) Prior Publication Data
US 2023/0127402 A1    Apr. 27, 2023

(30) Foreign Application Priority Data
Aug. 28, 2020    (KR) .................. 10-2020-0109043

(51) Int. Cl.
*G01N 21/25* (2006.01)
*F26B 3/04* (2006.01)
(Continued)

(52) U.S. Cl.
CPC ............. *G01N 21/251* (2013.01); *F26B 3/04* (2013.01); *F26B 3/30* (2013.01); *F26B 13/002* (2013.01);
(Continued)

(58) Field of Classification Search
CPC .... G01N 21/251; G01N 21/293; G01N 21/81; F26B 3/04; F26B 3/30; F26B 13/002;
(Continued)

(56) References Cited

U.S. PATENT DOCUMENTS 9,397,343 B1 *   7/2016   Cheng ...................... C25D 3/38
9,911,972 B2 *   3/2018   Takahata ............. H01M 4/0416
(Continued)

FOREIGN PATENT DOCUMENTS

CN           103344575 A           10/2013
CN           105890763 A           8/2016
(Continued)

OTHER PUBLICATIONS

Extended European Search Report dated May 31, 2023, issued in corresponding EP Patent Application No. 20951684.8. Note: US 2020240915A1, US 2017261310A1, 2008176144A1, and . KR 20130076759A cited therein are already of record.
(Continued)

*Primary Examiner* — Mohamed K Amara
*Assistant Examiner* — Noah J. Haney
(74) *Attorney, Agent, or Firm* — MORGAN, LEWIS & BOCKIUS LLP

(57) ABSTRACT

The present invention relates to an apparatus for evaluating drying quality of an electrode, and the apparatus includes: an oven configured to provide a space in which an electrode is dried; a measuring unit configured to be positioned at an outlet of the oven and measure a color coordinate value of an electrode active material layer with respect to the dried
(Continued)

electrode; and an determination unit configured to determine whether the electrode is dry from the color coordinate value, wherein the determination unit sets a reference value, and determines that a dry state of the electrode is defective if the measured color coordinate value is less than the reference value, and a difference between the measured color coordinate value and the reference value is more than a preset value.

17 Claims, 6 Drawing Sheets

(51) Int. Cl.
    *F26B 3/30* (2006.01)
    *F26B 13/00* (2006.01)
    *F26B 13/10* (2006.01)
    *F26B 25/22* (2006.01)
    *G01J 3/46* (2006.01)
    *G01N 21/29* (2006.01)
    *G01N 21/81* (2006.01)
    *H01M 4/04* (2006.01)
    *H01M 4/505* (2010.01)
    *H01M 4/525* (2010.01)

(52) U.S. Cl.
    CPC ............ *F26B 13/103* (2013.01); *F26B 25/22* (2013.01); *F26B 25/225* (2013.01); *G01J 3/46* (2013.01); *G01N 21/293* (2013.01); *G01N 21/81* (2013.01); *H01M 4/0404* (2013.01); *H01M 4/0435* (2013.01); *H01M 4/0471* (2013.01); *H01M 4/505* (2013.01); *H01M 4/525* (2013.01); *Y02E 60/10* (2013.01); *Y02P 70/50* (2015.11)

(58) Field of Classification Search
    CPC ...... F26B 13/103; F26B 25/22; F26B 25/225; G01J 3/46; H01M 4/0404; H01M 4/0435; H01M 4/0471; H01M 4/505; H01M 4/525; Y02E 60/10; Y02P 70/50
    USPC .......................................................... 356/402
    See application file for complete search history.

(56) References Cited

U.S. PATENT DOCUMENTS

| | | | | |
|---|---|---|---|---|
| 2006/0210142 | A1* | 9/2006 | Oguni | G06T 7/90 348/126 |
| 2007/0055951 | A1* | 3/2007 | Hayashi | G01B 11/0625 356/243.1 |
| 2008/0176144 | A1 | 7/2008 | Iwama et al. | |
| 2009/0111031 | A1* | 4/2009 | Hirose | H01M 4/622 429/338 |
| 2010/0156290 | A1 | 6/2010 | Kim et al. | |
| 2010/0290044 | A1* | 11/2010 | Lee | H01M 50/46 356/402 |
| 2011/0102809 | A1* | 5/2011 | Moon | G01B 7/003 118/712 |
| 2012/0311852 | A1 | 12/2012 | Onoda et al. | |
| 2014/0113063 | A1 | 4/2014 | Nakano | |
| 2017/0261310 | A1 | 9/2017 | Eun et al. | |
| 2017/0309213 | A1* | 10/2017 | Roh | G09G 3/2003 |
| 2019/0312282 | A1 | 10/2019 | Shibano et al. | |
| 2020/0240915 | A1 | 7/2020 | Son et al. | |

FOREIGN PATENT DOCUMENTS

| | | | | |
|---|---|---|---|---|
| CN | 108050773 | A | 5/2018 | |
| CN | 209242898 | U | 8/2019 | |
| CN | 110418956 | A | 11/2019 | |
| JP | H0911446 | A | 1/1997 | |
| JP | H09-283123 | A | 10/1997 | |
| JP | 3661230 | B2 * | 6/2005 | ............... G01J 3/46 |
| JP | 2009-149461 | A | 7/2009 | |
| JP | 2010-102873 | A | 5/2010 | |
| JP | 4470917 | B2 | 6/2010 | |
| JP | 2010-153366 | A | 7/2010 | |
| JP | 2011-100565 | A | 5/2011 | |
| JP | WO2011/104843 | A1 | 6/2013 | |
| JP | 2013-137168 | A | 7/2013 | |
| JP | 2013239348 | A * | 11/2013 | ............. Y02E 60/10 |
| JP | 2014-086151 | A | 5/2014 | |
| JP | 2019-020311 | A | 2/2019 | |
| KR | 20130076758 | A * | 12/2011 | ............. F26B 13/10 |
| KR | 10-2013-0076758 | A | 7/2013 | |
| KR | 10-2013-0076759 | A | 7/2013 | |
| KR | 10-1417565 | B1 | 7/2014 | |
| KR | 10-2017-0068977 | A | 6/2017 | |
| KR | 10-2017-0106587 | A | 9/2017 | |
| KR | 10-2019-0016049 | A | 2/2019 | |
| KR | 10-2019-0084470 | A | 7/2019 | |

OTHER PUBLICATIONS

Office action dated Aug. 28, 2023 issued in corresponding Japanese Patent Application No. 2022-547278.
European Office Action issued in application 20951684.8 dated Feb. 29, 2024.
Cielab color space—Wikipedia, Feb. 11, 2024, [https://en.wikipedia.org/wiki/CIELAB_color_space, retrieved on Feb. 12, 2024].
Luminance—Wikipedia, Feb. 11, 2024, [https://en.wikipedia.org/wiki/Luminance, retrieved on Feb. 12, 2024.].
Relative Luminance—Wikipedia, Feb. 11, 2024, [https://en.wikipedia.org/wiki/Relative_luminance, retrieved on Feb. 12, 2024.].
International Search Report (with partial translation) and Written Opinion dated May 7, 2021 issued in corresponding International Patent Application No. PCT/KR2020/015814.
S.K. Bhadra et al., Estimation of the Influence of Soil Moisture on Soil Coulour, Z. Pflanzenernahr Bodmk, vol. 160, pp. 401-405, Dec. 31, 1997.
Tian-xu Mao et al., Study on Relationship between Soil Surface Mositure Content andd Soil Gray Level, Journal of Soil and Water Conservation, vol. 25, No. 1, pp. 245-248, Feb. 28, 2011.
Office Action dated Mar. 19, 2025 for the corresponding Chinese Patent Application No. 202080096057.X. Note: US 2017/0261310.

* cited by examiner

[FIG. 1]
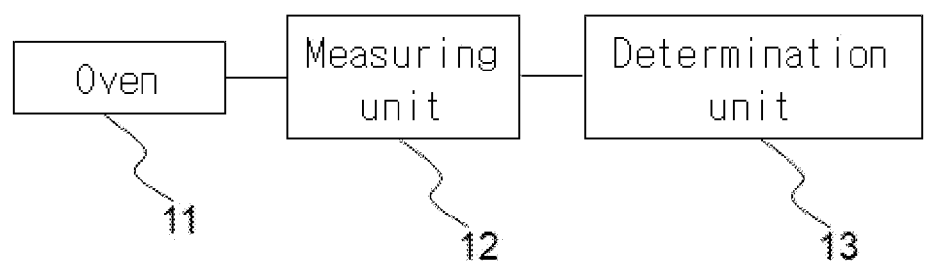

[FIG. 2]
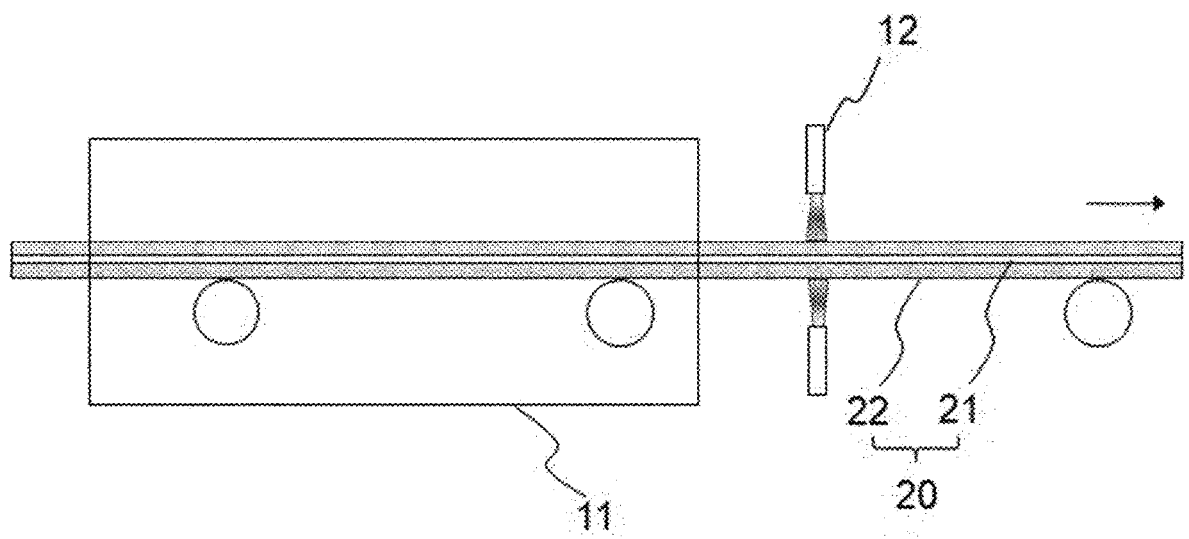

[FIG. 3]
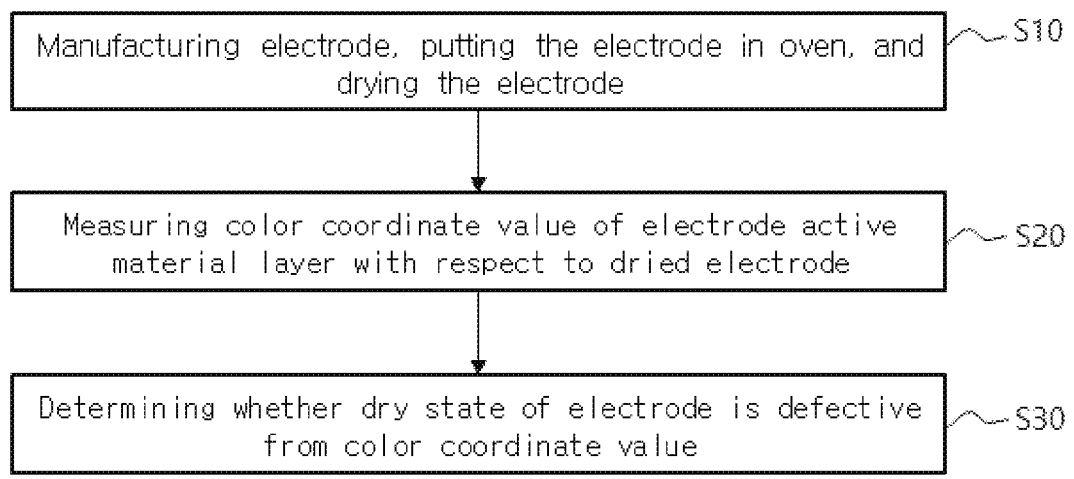

[FIG. 4]
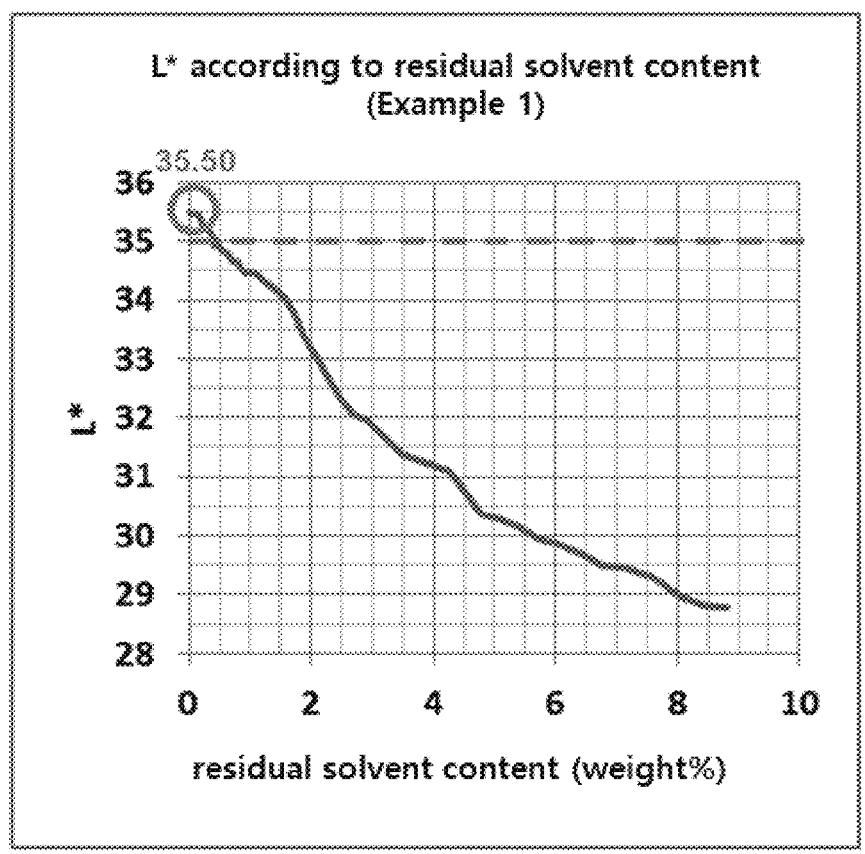

[FIG. 5]
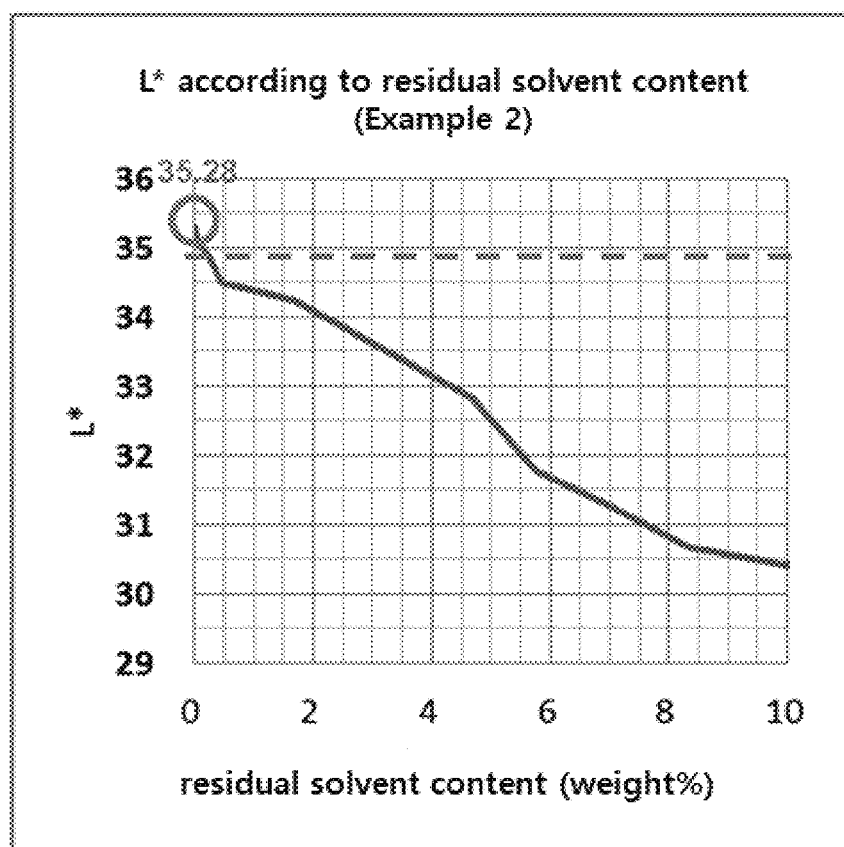

[FIG. 6]
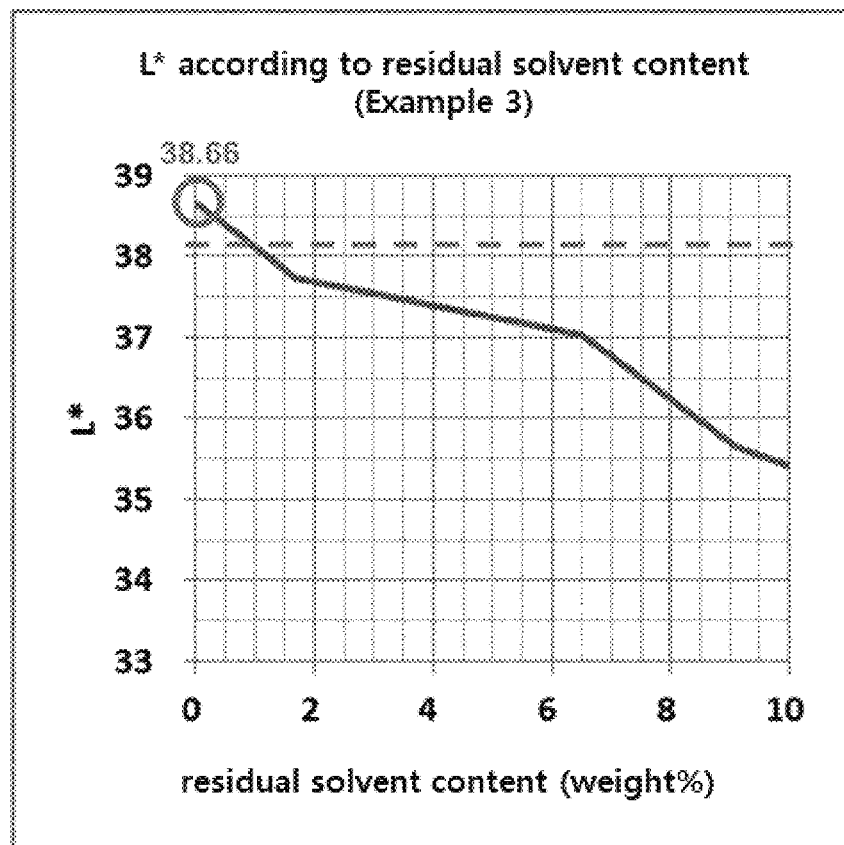

DRY QUALITY EVALUATION DEVICE FOR ELECTRODE AND DRY QUALITY EVALUATION METHOD FOR ELECTRODE

TECHNICAL FIELD

This application claims the benefit of priority based on Korean Patent Application No. 10-2020-0109043, filed on Aug. 28, 2020, and the entire contents of the Korean patent application are incorporated herein by reference.

The present invention relates to an apparatus for evaluating drying quality of an electrode and a method for evaluating drying quality of an electrode, and more particularly, to an apparatus for evaluating drying quality of an electrode and a method for evaluating drying quality of an electrode by measuring a simple color coordinate value of an electrode.

BACKGROUND ART

Recently, secondary batteries capable of charging and discharging have been widely used as energy sources of wireless mobile devices. In addition, the secondary battery has attracted attention as an energy source of an electric vehicle, a hybrid electric vehicle, etc., which are proposed as a solution for air pollution of existing gasoline vehicles and diesel vehicles using fossil fuel. Therefore, the types of applications using the secondary battery are currently much diversified due to the advantages of the secondary battery, and it is expected that the secondary battery will be applied to many fields and products in the future.

Such secondary batteries may be classified into lithium ion batteries, lithium ion polymer batteries, lithium polymer batteries, etc., depending on the composition of the electrode and the electrolyte, and among them, the amount of use of lithium-ion polymer batteries that are less likely to leak electrolyte and are easy to manufacture is on the increase. In general, secondary batteries are classified into cylindrical batteries and prismatic batteries in which an electrode assembly is embedded in a cylindrical or rectangular metal can, depending on the shape of a battery case, and pouch-type batteries in which the electrode assembly is embedded in a pouch-type case of an aluminum laminate sheet. The electrode assembly built into the battery case is composed of a positive electrode, a negative electrode, and a separator interposed between the positive electrode and the negative electrode, and is a power generating element capable of charging and discharging. The electrode assembly is classified into a jelly-roll type wound with a separator interposed between the positive electrode and the negative electrode which are long sheet-shaped and are coated with active materials, and a stack type in which a plurality of positive electrodes and negative electrodes of a predetermined size are sequentially stacked while a separator is interposed therebetween.

Such an electrode may be manufactured by applying an electrode slurry containing an electrode active material and a solvent on a current collector to form an electrode active material layer, followed by drying and rolling. At this time, the quality of the electrode is determined according to the drying conditions. If the amount of drying heat is excessive, a significant amount of the binder in the electrode slurry moves to the surface during the drying process, thereby reducing the adhesive force of the electrode. If the amount of drying heat is low, the solvent remains in the electrode, causing roll contamination in the coating and rolling process. This increase in roll contamination causes defects on the electrode surface, and the residual solvent in the electrode becomes a major factor in safety problems such as gas generation and swelling in the battery, so it is necessary to develop an evaluation method to determine whether the electrode is dry.

In this regard, conventionally, a device such as a web-gauge was used to measure the change in weight of the electrode to evaluate the degree of drying. Specifically, the difference in weight of the electrode before and after coating is calculated to calculate the weight per unit area of the electrode slurry before drying, and after drying, the weight per unit area of the electrode slurry is calculated in the same manner. Next, the presence or absence of residual solvent is determined from the difference between the theoretical electrode weight derived from the solid content in the electrode slurry and the weight per unit area of the electrode slurry before drying, and the previously calculated weight per unit area of electrode slurry after drying.

However, in this method, the weight of the electrode should be measured three times before coating, after coating and after drying. In addition, in the case of an electrode coated with an electrode slurry on both sides of a current collector, since the weight of the electrode slurry coated on both sides should be measured before and after drying, a total of five weights should be measured, which takes a long time and cost to evaluate. In addition, since the web gauge for measuring the weight of the electrode uses a radioactive isotope such as 85Kr, a radiation exposure problem may occur accordingly.

Accordingly, there is a need to develop an apparatus and method for evaluating the drying quality of an electrode that can solve the above problems.

DISCLOSURE

Technical Problem

The present invention is devised to solve the above problems, and an object of the present invention is to provide an apparatus for evaluating drying quality of an electrode and a method for evaluating drying quality of an electrode capable of reducing the time and cost of evaluation and securing safety in the evaluation process by quickly determining the drying level of the electrode by determining the presence or absence of solvent in the electrode in the process.

Technical Solution

An apparatus for evaluating drying quality of an electrode according to the present invention includes: an oven configured to provide a space in which an electrode is dried; a measuring unit configured to be positioned at an outlet of the oven and measure a color coordinate value of an electrode active material layer with respect to the dried electrode; and an determination unit configured to determine whether a dry state of the electrode is defective from the color coordinate value, wherein the determination unit sets a reference value, and determines that a dry state of the electrode is defective if the measured color coordinate value is less than the reference value, and a difference between the measured color coordinate value and the reference value is more than a preset value.

In one example, the color coordinate value is L*.

In another example, the color coordinate value is a gray value according to a gray scale.

In one example, the measuring unit includes a spectrophotometer or a colorimeter.

In another example, the measuring unit includes an image sensor capable of taking an image of a surface of the electrode active material layer.

In one example, the determination unit derives a reference value from an average value of color coordinate values for a plurality of electrodes.

In another example, the determination unit derives a reference value from a profile of an electrode color coordinate value according to a residual solvent content in the electrode.

In a specific example, the determination unit determines that a dry state of the electrode is defective when a difference between the measured color coordinate value and the reference value is 0.5 or more.

Further, the present invention provides a method for evaluating drying quality of an electrode. The method includes: a step of manufacturing an electrode by forming an electrode active material layer including an electrode active material on a current collector, and putting the electrode in an oven of the above described apparatus to thereby dry the electrode; a step of measuring a color coordinate value of an electrode active material layer with respect to the dried electrode; and a step of determining whether the electrode is dry from the color coordinate value, wherein it is determined that a dry state of the electrode is defective when the measured color coordinate value is less than the reference value, and a difference between the measured color coordinate value and the reference value is a predetermined value or more.

In a specific example, the electrode may not be rolled.

In one example, the color coordinate value is L*.

In another example, the color coordinate value is a gray value according to a gray scale.

In one example, the step of measuring the color coordinate value of the electrode active material layer may be performed through a spectrophotometer or a colorimeter.

In another example, the step of measuring the color coordinate value of the electrode active material layer includes obtaining an image by photographing the surface of the electrode through illumination and an image sensor, and converting the color information of the image into color coordinates.

In one example, the reference value may be derived from an average value of color coordinate values for the plurality of electrodes after manufacturing a plurality of electrodes.

In another example, the reference value may be derived from a profile of an electrode color coordinate value according to a residual solvent content in the electrode.

In this case, the reference value may be derived from a color coordinate value of an electrode that satisfies the content of the residual solvent in the target electrode.

Further, it may be determined that the dry state of the electrode is defective when the difference between the measured color coordinate value and the reference value is 0.5 or more.

At this time, a residual solvent content in the electrode of the electrode sample determined as a good product is 1% by weight or less.

Further, the present invention provides a method for manufacturing an electrode. The method includes: a step of evaluating drying quality of an electrode according to the above described method of evaluating the drying quality of the electrode; and a step of rolling the electrode determined to be good.

Advantageous Effects

According to the present invention, by measuring a simple color coordinate value after manufacturing and drying an electrode, it is possible to simply determine the degree of drying of the electrode and whether or not the drying is defective, thereby reducing the time and cost required for the measurement. In addition, since lighting and sensors are used instead of web gauges as measuring equipment, safety in the evaluation process can be secured.

BRIEF DESCRIPTION OF THE DRAWINGS

FIG. 1 is a block diagram showing the configuration of an apparatus for evaluating drying quality of an electrode according to the present invention.

FIG. 2 is a schematic diagram showing an operating method of an apparatus for evaluating drying quality of an electrode according to the present invention.

FIG. 3 is a flowchart showing the procedure of a method for evaluating dry quality of an electrode according to the present invention.

FIGS. 4 to 6 are color coordinates of an electrode according to an embodiment of the present invention and a measurement value of the residual moisture amount of the electrode accordingly.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, the present invention will be described in detail with reference to the drawings.

FIG. 1 is a block diagram showing the configuration of an apparatus for evaluating drying quality of an electrode according to the present invention.

Referring to FIG. 1, an apparatus 10 for evaluating drying quality of an electrode according to the present invention includes: an oven 11 configured to provide a space in which an electrode is dried; a measuring unit 12 configured to be positioned at an outlet of the oven 11 and measure a color coordinate value of an electrode active material layer with respect to the dried electrode; and an determination unit 13 configured to determine whether the electrode is dry from the color coordinate value, wherein the determination unit 13 sets a reference value, and determines that a dry state of the electrode is defective if the measured color coordinate value is less than the reference value, and a difference between the measured color coordinate value and the reference value is more than a preset value.

As described above, conventionally, a device such as a web-gauge was used to measure the change in weight of the electrode to evaluate the degree of drying, but in this case, since it is necessary to individually measure the electrode slurry coated on the current collector, it takes a long time and cost for evaluation. In addition, the web gauge for measuring the weight of the electrode has a problem that a worker may be exposed to radiation.

However, according to the present invention, by measuring a simple color coordinate value after manufacturing and drying an electrode, it is possible to simply determine the degree of drying of the electrode and whether or not the drying is defective, thereby reducing the time and cost required for the measurement. In addition, since lighting and sensors are used instead of web gauges as measuring equipment, safety in the evaluation process can be secured.

Hereinafter, each configuration of the apparatus for evaluating the drying quality of an electrode according to the present invention will be described in detail.

FIG. 2 is a schematic diagram showing an operating method of an apparatus for evaluating drying quality of an electrode according to the present invention.

Referring to FIG. 2 together with FIG. 1, an oven 11 provides a space in which the electrode 20 is put and dried. The oven 11 includes a hot air nozzle (not shown) or an infrared heater (not shown) for drying the electrode 20 therein. The hot air nozzle and the infrared heater may be arranged to be spaced apart at predetermined intervals along the transport direction of the electrode 20, and apply hot air or infrared rays in a direction perpendicular to the electrode 20. Details of the hot air nozzle and infrared heater are known to those of ordinary skill in the art, and thus detailed descriptions thereof will be omitted.

Meanwhile, the electrode 20 is manufactured by forming an electrode active material layer 22 on the current collector 21.

In this case, the electrode active material layer 22 may be formed by applying an electrode slurry including an electrode active material, a conductive material, and a binder on the current collector 21. The electrode 20 may be a negative electrode or a positive electrode, and the current collector may be a positive electrode current collector or a negative electrode current collector.

In the present invention, the positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

The sheet for the negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

In the present invention, the positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCO_{1-(b+c+d)}M_dO_{(2-e)}A_e$ such as $Li_{1+z}Ni_{1/3}Co_{1/3}Mn_{1/3}O_2$, $Li_{1+z}Ni_{0.4}Mn_{0.4}Co_{0.2}O_2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, b+c+d<1, M=Al, Mg, Cr, Ti, Si or Y, and A=F, P or Cl); olivine-based lithium metal phosphate represented by the formula $Li_{1+x}M_{1-y}M'_yPO_{4-z}X_z$ (wherein M=transition metal, preferably Fe, Mn, Co or Ni, M'=Al, Mg or Ti, X=F, S or N, and $-0.5 \leq x \leq 0.5$, $0 \leq y \leq 0.5$, $0 \leq z \leq 0.1$).

Examples of the negative electrode active material include carbon such as non-graphitized carbon and graphite carbon; metal complex oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, groups 1, 2, and 3 of the periodic table, halogen; $0 < x \leq 1$; $1 \leq y \leq 3$; $1 \leq z \leq 8$); lithium alloy; silicon alloy; tin alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

Meanwhile, such an electrode slurry may be prepared by dissolving an electrode active material, a conductive material, and a binder in a solvent. The type of the solvent is not particularly limited as long as it is capable of dispersing an electrode active material, and either an aqueous solvent or a non-aqueous solvent may be used. For example, the solvent may be a solvent generally used in the art, such as dimethyl sulfoxide (DMSO), isopropyl alcohol, N-methylpyrrolidone (NMP), acetone, or water, and one of them alone or a mixture of two or more may be used. The amount of the solvent used may be such that the slurry can be adjusted to have an appropriate viscosity in consideration of the coating thickness, production yield, and workability of the slurry, and is not particularly limited.

Meanwhile, the measuring unit 12 measures a color coordinate value for the dried electrode 20. In this case, the color coordinate value of the electrode may be a color coordinate value measured at a certain point of a certain electrode active material layer, and after selecting several measurement points in the electrode active material layer, the average value of the color coordinate values measured at the measurement points may be used as the color coordinate value.

Referring to FIG. 2, the measuring unit 12 may measure a color coordinate value after the electrode 20 comes out of the oven 11. To this end, the measuring unit 12 may be installed to be located at the outlet of the oven 11. In addition, in the present invention, when the electrode active material layers 22 are formed on both sides of the current collector 21 as shown in FIG. 2, measuring units 12 may be positioned on both sides of the electrode 20 to measure the dry state of each electrode active material layer 22.

The measuring unit 12 may include a lighting capable of irradiating light onto the surface of the electrode 20. In this case, there is no particular limitation on the type as long as light can be illuminated on the surface of the electrode active material layer 22 as the lighting, but, for example, LED lighting may be used.

The present invention installs only a simple device capable of measuring color coordinates at the outlet of the oven and quantifies the dry state of the electrode through color coordinate measurement, thereby simplifying the configuration of the measuring device and reducing the time and cost required for evaluation. In addition, since the LED is used as the lighting, it is possible to secure the safety of the operator compared to the web gauge.

In one example, the color coordinate value may be L*. The L* is one of the variables representing the L*a*b* colorimeter defined by the CIE. In the L*a*b* colorimeter, the color coordinate L* is a value related to the measured lightness of an object and is displayed from 0 to 100. Values a and b are values related to chromaticity representing color and chroma, and a is for the horizontal axis and b is for the vertical axis. The +a side is red, the −a side is green, the +b side is yellow, and the −b side is blue. That is, in the present invention, it is possible to determine whether the electrode is dry by measuring the L* value related to the contrast among color coordinates. Specifically, when the electrode 20 is not dried, the reflectance decreases as the average refractive index at the surface of the electrode active material layer 22 decreases due to the solvent remaining in the electrode active material layer 22, thereby showing a darker color compared to the dried electrode 20, and the L* value will be measured smaller than the normal case.

In another example, the color coordinate value may be a gray value according to a gray scale. That is, an image of the dry surface of the electrode 20 may be converted into a gray scale capable of confirming only the contrast, and a gray value may be measured therefrom to determine whether the electrode 20 is dried. When the electrode 20 is undried, it exhibits a darker color than the dried electrode 20, and the gray value will be measured smaller than that of a normal case.

As described above, in the present invention, the color coordinates that can uniformly measure the contrast of the surface of the electrode active material layer 22 are used, and whether the electrode is dry or not can be intuitively determined by quantitatively measuring the contrast of the surface of the electrode active material layer 22.

In this case, in one example, the measuring unit 12 may use a colorimeter as a sensor for measuring a color coordinate value of the electrode active material layer 22. Specifically, the measuring unit 12 may include a spectrophotometer or a colorimeter. In this case, a color coordinate value may be directly measured on the surface of the electrode active material layer 22.

For example, the color coordinate value may be measured using a CM2600d manufactured by Konica Minolta as the colorimeter. Specifically, in order to measure the color coordinate value, the measurement mode was set to SCI (Specular Component Included) or SCE (Specular Component Excluded), standard light source D65 (color temperature: 6500K), CIE 1964 10° standard observer using Konica Minolta's CM2600d as the colorimeter, followed by white calibration, followed by touching the colorimeter to the location desired to be measured.

As described above, the color coordinate value may be measured using a colorimeter directly with respect to the electrode 20, but the color coordinate value may be indirectly measured using an image obtained by photographing the surface of the electrode active material layer 22.

In another example, the measuring unit 12 includes an image sensor capable of capturing an image of the surface of the electrode active material layer 22. In this case, an image of the surface of the electrode active material layer 22 is obtained by photographing the electrode 20, specifically, the surface of the electrode active material layer 22 through the image sensor. In this case, a camera may be used as the image sensor. When an image is obtained, it is converted into a color coordinate system to be measured, and a color coordinate value is measured. For example, after converting an image photographed through a camera into a gray scale, the gray value or L* value of the corresponding image may be measured.

When the color coordinate value is measured, the determination unit 13 determines whether a dry state of the electrode is defective from the color coordinate value. To this end, the determination unit 13 sets a reference value for defect determination. In addition, when the measured color coordinate value satisfies a preset electrode drying quality evaluation criterion, the determination unit 13 judges it as a good product, and if it does not satisfy a preset electrode drying quality evaluation criterion, it determines that it is defective. The determination unit 13 is connected to the measuring unit 12 by a network, and thus receives and analyzes color coordinate values stored in the measuring unit 12.

Specifically, when the measured color coordinate value is smaller than the reference value, and the difference between the measured color coordinate value and the reference value is greater than or equal to a preset value, the determination unit 13 determines that the dry state of the electrode is defective.

In one example, the determination unit 13 may derive a reference value from an average value of color coordinate values for a plurality of electrodes. In this case, after manufacturing a plurality of electrodes in advance to derive a reference value, color coordinate values for them may be measured. Alternatively, an average value of color coordinate values measured for a plurality of electrodes to be measured may be obtained. If the color coordinate value of any one of the plurality of electrodes is smaller than the average value by a predetermined value or more, the corresponding electrode is determined to be defective.

In another example, the determination unit 13 derives a reference value from a profile of color coordinate values of the electrode according to the residual solvent content in the electrode. In this case, the reference value may be derived from a color coordinate value of an electrode that satisfies the content of the residual solvent in the target electrode.

In order to obtain the profile, multiple electrode samples are manufactured under the same conditions and process as the electrode to be measured, the color coordinate values after drying and the solvent content in the electrode are measured, and then the color coordinate values according to the solvent content in the electrode of the electrode sample are made as a database. For example, in order to determine the trend of color coordinate values according to the solvent content in the electrode, it may be shown as a graph and converted into a database. The determination unit may set a color coordinate value of an electrode that satisfies the target solvent content in the electrode as a reference value in the database.

Further, in the present invention, the determination unit 13 determines that a dry state of the electrode is defective when the measured color coordinate value is less than the reference value, and a difference between the measured color coordinate value and the reference value is a predetermined value or more. The predetermined value can also be derived from the profile, for example.

In a specific example, the determination unit 13 may determine that the dry state of the electrode is defective when the difference between the measured color coordinate value and the reference value is 0.5 or more. That is, when the measured color coordinate value is smaller than the reference value by 0.5 or more, the determination unit 13 may determine that the dry state of the corresponding electrode is defective. When the difference between the reference value and the measured color coordinate value is within the above range, an electrode that satisfies the residual solvent content in the target electrode may be determined as a good product.

In addition, the present invention provides a method for evaluating the drying quality of an electrode.

FIG. 3 is a flowchart showing the procedure of a method for evaluating dry quality of an electrode according to the present invention.

Referring to FIG. 3, a method for evaluating drying quality of the electrode includes: a step (S10) of manufacturing an electrode by forming an electrode active material layer including an electrode active material on a current collector, and putting the electrode in an oven of the above described apparatus to thereby dry the electrode; a step (S20) of measuring a color coordinate value of the electrode active material layer with respect to the dried electrode; and a step (S30) of determining whether the electrode is dry from the color coordinate value, wherein it is determined that a dry state of the electrode is defective when the measured color coordinate value is less than the reference value, and a difference between the measured color coordinate value and the reference value is a predetermined value or more.

According to the present invention, by measuring a simple color coordinate value after manufacturing and drying an electrode, it is possible to simply determine the degree of drying of the electrode and whether or not the drying is defective, thereby reducing the time and cost required for the measurement. In addition, since lighting and sensors are used instead of web gauges as measuring equipment, safety in the evaluation process can be secured.

Hereinafter, each step of the method for evaluating the drying quality of an electrode according to the present invention will be described in detail.

<Preparation and Drying of Electrode>

Referring to FIG. 3 together with FIGS. 1 and 2, first, an electrode 20 is manufactured by forming an electrode active material layer 22 including an electrode active material on the current collector 21 in order to measure color coordinate values. Details of the electrode are the same as described above.

When manufacturing of the electrode 20 is completed, the electrode 20 is put into the oven 11 and dried. In this case, the drying time and the drying heat amount may be determined by the specifications of the electrode, for example, the loading amount of the electrode active material or the solvent content in the electrode slurry. The dried electrode 20 is discharged out of the oven 11.

<Measurement of Color Coordinate Value>

When drying of the electrode 20 is completed, a color coordinate value is measured for the dried electrode 20. At this time, the color coordinate value of the electrode active material layer 22 is measured by the measuring unit 12 according to the apparatus 10 for evaluating dry quality of the electrode as described above. Since the measuring unit 12 is located near the outlet of the oven 11, the color coordinate value can be measured directly with respect to the electrode 20 discharged from the oven 11. As described above, the color coordinate value of the electrode 20 may be a color coordinate value measured at a certain point of a certain electrode active material layer 22, or may be the average value of the color coordinate values measured at the measurement points after selecting several measurement points in the electrode active material layer 22.

The present invention installs only a simple device capable of measuring color coordinates near the outlet of the oven and quantifies the dry state of the electrode through color coordinate measurement, thereby simplifying the measuring method and reducing the time and cost required for evaluation.

Meanwhile, in a specific example of the present invention, the electrode may not be rolled. That is, the present invention does not evaluate the electrode that has passed through the rolling process, but by performing the evaluation on the electrode that has not undergone the rolling process, it is possible to filter out defective electrodes before the rolling process and significantly reduce the defect rate after the rolling process. This can prevent contamination of the rolling roll, etc. due to residual solvent in the electrode in the rolling process. However, the present invention is not limited thereto, and color coordinates may be measured at any stage after drying the electrode.

In one example, the color coordinate value may be L*. As described above, L* is a value related to the measured lightness of the object and may be displayed from 0 to 100. When the electrode is undried, the average refractive index on the surface of the electrode active material layer decreases due to the solvent remaining in the electrode active material layer, so that it exhibits a darker color than the dried electrode, and the L* value will be measured smaller than that of a normal case.

In another example, the color coordinate value may be a gray value according to a gray scale. That is, an image of the dry surface of the electrode may be converted into a gray scale capable of confirming only the contrast, and a gray value may be measured therefrom to determine whether the electrode is dried. When the electrode is undried, it exhibits a darker color than the dried electrode, and the gray value will be measured smaller than that of a normal case.

As described above, in the present invention, the color coordinates that can uniformly measure the contrast of the electrode surface are used, and whether the electrode is dry or not can be determined by quantitatively measuring the contrast of the surface of the electrode active material layer.

In one example, a colorimeter may be used as a sensor that measures a color coordinate value of the electrode active material layer. Specifically, the step of measuring the color coordinate value of the electrode active material layer may be performed through a spectrophotometer or a colorimeter. In this case, a color coordinate value may be directly measured on the surface of the electrode active material layer.

For example, the color coordinate value may be measured using a CM2600d manufactured by Konica Minolta as the colorimeter. Specifically, in order to measure the color coordinate value, the measurement mode was set to SCI (Specular Component Included) or SCE (Specular Component Excluded), standard light source D65 (color temperature: 6500K), CIE 1964 10° standard observer using Konica Minolta's CM2600d as the colorimeter, followed by white calibration, followed by touching the colorimeter to the location desired to be measured.

In another example, the step of measuring the color coordinate value of the electrode active material layer includes obtaining an image by photographing the surface of the electrode through illumination and an image sensor, and converting the color information of the image into color coordinates. In this case, an image of the electrode surface is obtained by photographing the electrode, specifically, the surface of the electrode active material layer through the image sensor. In this case, a camera may be used as the image sensor. When an image is obtained, it is converted into a color coordinate system to be measured, and a color coordinate value is measured. For example, after converting an image photographed through a camera into a gray scale, the gray value or L* value of the corresponding image may be measured.

In the present invention, since the LED light source is used as the lighting, the safety of the operator can be secured compared to the web gauge.

<Judgment of Whether Dry State is Defective>

When the color coordinate value is measured, it is determined from this whether a dry state of the electrode is defective. The present invention includes a step of determining it as a good product if the measured color coordinate value satisfies a preset electrode drying quality evaluation criterion and determining it as a defective product if it does not satisfy a preset electrode drying quality evaluation criterion. This is performed by the determination unit 13 included in the apparatus for evaluating the drying quality of the electrode as described above.

Specifically, in the present invention, a reference value of a color coordinate value for determining whether a dry state of the electrode is defective is set, and it is determined that a dry state of the electrode is defective when the measured color coordinate value is less than the reference value, and a difference between the measured color coordinate value and the reference value is a predetermined value or more.

In one example, the reference value may be derived from an average value of color coordinate values for the plurality of electrodes after manufacturing a plurality of electrodes. In this case, after manufacturing a plurality of electrodes in advance to derive a reference value, color coordinate values for them may be measured. Alternatively, an average value of color coordinate values measured for a plurality of electrodes to be measured may be obtained. At this time, if the color coordinate value of any one of the plurality of electrodes is smaller than the average value by a predetermined value or more, the corresponding electrode may be determined as a defect.

In another example, the reference value may be derived from a profile of an electrode color coordinate value according to a residual solvent content in the electrode. The reference value may be derived from a color coordinate value of an electrode that satisfies the content of the residual solvent in the target electrode.

Specifically, a plurality of electrode samples are prepared under the same conditions and the same process as the electrode to be measured, and after drying, the color coordinate value and the solvent content in the electrode are measured. Subsequently, a color coordinate value according to the solvent content in the electrode of the electrode sample may be converted into a database. For example, in order to determine the trend of color coordinate values according to the solvent content in the electrode, it may be shown as a graph and converted into a database. Subsequently, in the database, a color coordinate value of an electrode that satisfies a target solvent content in the electrode may be set as a reference value.

Further, in the present invention, it is determined that a dry state of the electrode is defective when the measured color coordinate value is less than the reference value, and a difference between the measured color coordinate value and the reference value is a predetermined value or more. The predetermined value can also be derived from the profile, for example.

In a specific example, it may be determined that the dry state of the electrode is defective when the difference between the measured color coordinate value and the reference value is 0.5 or more. That is, when the measured color coordinate value is smaller than the reference value by 0.5 or more, it may be determined that the dry state of the corresponding electrode is defective. When the difference between the reference value and the measured color coordinate value is within the above range, an electrode that satisfies the residual solvent content in the target electrode may be determined as a good product.

In this case, the residual solvent content in the electrode of the electrode sample determined as good product may be 1% by weight or less, and in detail, 0.5% by weight or less. When the residual solvent content in the electrode is within the above range, the drying quality of the electrode is excellent, so that roll contamination in the rolling process, gas generation, swelling phenomenon, etc. in the battery can be prevented. The content of the residual solvent in the electrode of the electrode sample determined as a good product may be changed depending on the composition of the electrode and the solid content in the electrode. In this way, the present invention can detect up to 1.0% by weight or less of moisture through measurement of color coordinates.

Further, the present invention provides a method for manufacturing an electrode. The method includes: a step of evaluating drying quality of an electrode according to a method of evaluating the drying quality of the above described electrode; and a step of rolling the electrode determined to be good.

The electrode manufactured according to the method of manufacturing an electrode according to the present invention can be used to manufacture a lithium secondary battery as a positive electrode or a negative electrode, and since the drying quality is excellent, the defect rate of the lithium secondary battery can be reduced.

The lithium secondary battery may be usefully used in portable devices such as mobile phones, notebook computers, and digital cameras, and electric vehicles such as hybrid electric vehicles (HEVs).

Hereinafter, the present invention will be described in detail with reference to examples. However, the embodiments according to the present invention may be modified into various other forms, and the scope of the present invention should not be construed as being limited to the examples described below. The examples of the present invention are provided to more fully describe the present invention to those skilled in the art.

Example 1

<Preparation of Electrode>

An electrode slurry was prepared by mixing 41 parts by weight of natural graphite, 0.5 parts by weight of a conductive material, 2.5 parts by weight of SBR, and 1 part by weight of CMC with 55 parts by weight of water.

The electrode slurry was coated on one surface of a copper current collector having a thickness of 8 μm at a loading amount of 0.014 g/cm$^2$ and dried to form an electrode active material layer having a thickness of 144 μm to prepare an electrode. Subsequently, an active material layer was formed on the other surface of the current collector under the same process conditions, and an electrode having a total active material layer thickness of 288 μm formed on both surfaces of the copper current collector was manufactured. At this time, the solid content in the electrode slurry was 45% by weight.

<Measurement of Color Coordinate Value>

After manufacturing a plurality of the electrodes, the measurement mode was set to SCI, standard light source D65 (color temperature: 6500K), CIE 1964 10° standard observer using Konica Minolta's CM2600d as a colorimeter, followed by white correction, followed by touching the colorimeter to the location desired to be measured, to thereby measuring the color coordinate value (L*) of the prepared electrode active material layer.

<Reference Value Setting>

For the prepared plurality of electrodes, an average value of color coordinate values was calculated, and this was used as a reference value. In this case, the reference value was 35.50 as shown in FIG. 4.

<Judgment of Whether or not Dry State is Defective>

For the plurality of electrodes manufactured above, if the color coordinate value is smaller than the reference value, and the difference between the reference value and the measured color coordinate value is 0.5 or more, it was determined as defective. A point at which the difference between the reference value and the color coordinate value is 0.5 is shown by a dotted line in FIG. 4.

Example 2

When manufacturing the electrode, it was determined whether a dry state of the electrode is defective in the same manner as in Example 1, except that the content of SBR as a binder was 1.0 part by weight. In this case, the reference value was 35.28 as shown in FIG. 5. In addition, a point at which the difference between the reference value and the color coordinate value is 0.5 is shown by a dotted line in FIG. 5.

Example 3

It was determined whether a dry state of the electrode was defective in the same manner as in Example 1 except that when manufacturing the electrode, a mixture of natural graphite and artificial graphite in a ratio of 1:1 was used, and a solid content of 40% by weight was used. In this case, the reference value was 38.66 as shown in FIG. 6. In addition, a point at which the difference between the reference value and the color coordinate value is 0.5 is shown by a dotted line in FIG. 6.

Experimental Example

For the electrodes measured in Examples 1 to 3, the residual solvent content of the electrode was measured.

The residual solvent content of the electrode can be measured by the following method.

Specifically, the weight per unit area of the copper current collector before coating is measured. Subsequently, after coating the electrode slurry, the weight per unit area of the electrode (weight of the electrode active material layer+ weight of the copper current collector) was measured, and then the weight per unit area of the electrode active material layer before drying is calculated by excluding the weight per unit area of the copper current collector.

Thereafter, the electrode is dried, and the weight per unit area of the electrode is measured after drying, and the weight per unit area of the electrode active material layer after drying is measured by excluding the weight per unit area of the copper current collector.

The content of the residual solvent may be derived from the weight of the electrode active material layer before and after drying and the solid content included in the electrode slurry. In this case, the weight per unit area can be measured using a web gauge. Any web gauge available on the market can be used. For example, Thermo Fisher's Thermo Scientific™ web gauge may be used.

For the residual solvent content of the electrode measured as described above, color coordinate values (L*) according to the residual solvent content are shown in FIGS. 4 to 6, respectively.

Referring to FIGS. 4 to 6, as the content of residual solvent in the electrode increases, the color coordinate value tends to decrease. In addition, the electrode determined to be good (corresponding to the electrode with a difference between the measured color coordinate value and the reference value of less than 0.5, the electrode located above the dotted line) has a residual solvent content of 0.5% by weight or less (Examples 1 and 2) or 1.0% by weight or less (Example 3), which has satisfied the standard of good quality. That is, in the present invention, it is possible to detect a moisture content of 1.0% by weight or less through measurement of color coordinates.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

On the other hand, in this specification, terms indicating directions such as up, down, left, right, before, and after are used, but it is obvious that these terms are for convenience of description only and may change depending on the location of the object or the location of the observer.

DESCRIPTION OF REFERENCE NUMERALS

10: apparatus for evaluating drying quality of electrode
11: oven
12: measuring unit
13: determination unit
20: electrode
21: current collector
22: electrode active material layer

The invention claimed is:

1. An apparatus for evaluating drying quality of an electrode, the apparatus comprising:
an oven configured to provide a space in which an electrode is dried;
a sensor configured to be positioned at an outlet of the oven and to measure a color coordinate value of an electrode active material layer of the dried electrode; and
a processor configured to determine whether a dry state of the dried electrode is defective from the color coordinate value, to set a reference value, and to determine that the dry state is defective if the measured color coordinate value is less than the reference value, and a difference between the measured color coordinate value and the reference value is 0.5 or more,
wherein the color coordinate value is L*.

2. The apparatus of claim 1, wherein the color coordinate value is a gray value according to a gray scale.

3. The apparatus of claim 1, wherein the sensor is a spectrophotometer or a colorimeter.

4. The apparatus of claim 1, wherein the sensor is an image sensor capable of taking an image of a surface of the electrode active material layer.

5. The apparatus of claim 1, wherein the processor is further configured to derive the reference value from an average value of color coordinate values for a plurality of electrodes.

6. The apparatus of claim 1, wherein the processor is further configured to derive the reference value from a profile of an electrode color coordinate value according to a residual solvent content in the dried electrode.

7. A method for evaluating drying quality of an electrode using the apparatus according to claim 1, the method comprising:
manufacturing the electrode by forming the electrode active material layer including an electrode active material on a current collector, and putting the electrode in the oven of the apparatus to thereby dry the electrode;
measuring, by the sensor, the color coordinate value of the electrode active material layer; and
determining, by the processor, whether the dry state is defective from the color coordinate value,
wherein it is determined that the dry state is defective when the measured color coordinate value is less than the reference value, and the difference between the measured color coordinate value and the reference value is 0.5 or more,
wherein the color coordinate value is L*.

8. The method of claim 7, wherein the electrode is not rolled.

9. The method of claim 7, wherein the color coordinate value is a gray value according to a gray scale.

10. The method of claim 7, wherein the measuring of the color coordinate value of the electrode active material layer is performed through a spectrophotometer or a colorimeter.

11. The method of claim 7, wherein the measuring of the color coordinate value of the electrode active material layer includes obtaining, by an image sensor, an image by photographing a surface of the dried electrode through illumination, and converting color information of the image into color coordinates.

12. The method of claim 7, wherein the reference value is derived from an average value of color coordinate values for a plurality of electrodes after manufacturing the plurality of electrodes.

13. The method of claim 7, wherein the reference value is derived from a profile of an electrode color coordinate value according to a residual solvent content in the dried electrode.

14. The method of claim 7, wherein the reference value is derived from a color coordinate value of a sample electrode satisfying a residual solvent content in a target electrode.

15. The method of claim 7, wherein a residual solvent content in a sample electrode determined as a good product is 1% by weight or less.

16. The method of claim 7, wherein the electrode active material layer further includes a conductive material and a binder.

17. A method for manufacturing an electrode, the method comprising:
evaluating drying quality of the electrode according to the method of claim 7; and
rolling the dried electrode determined to be good.

* * * * *